United States Patent [19]

Weber

[11] Patent Number: 4,797,123
[45] Date of Patent: Jan. 10, 1989

[54] PROGRAMMABLE MODULAR CONNECTOR ASSEMBLY

[75] Inventor: Ronald M. Weber, Cleona, Pa.
[73] Assignee: AMP Incorporated, Harrisburg, Pa.
[21] Appl. No.: 178,786
[22] Filed: Mar. 25, 1988

Related U.S. Application Data

[63] Continuation of Ser. No. 855,225, Apr. 22, 1986, abandoned.

[51] Int. Cl.⁴ .............................................. H01R 9/00
[52] U.S. Cl. .................................................... 439/717
[58] Field of Search ................................ 439/709–724

[56] References Cited

U.S. PATENT DOCUMENTS

| | | | |
|---|---|---|---|
| 2,724,814 | 11/1955 | Stubbers | 339/198 GA |
| 4,171,862 | 10/1979 | Krasser | 339/198 H |
| 4,178,545 | 12/1979 | Kneifel | 339/198 GA |
| 4,451,107 | 5/1984 | Dola et al. | 439/65 |

Primary Examiner—Joseph H. McGlynn
Attorney, Agent, or Firm—Katherine A. Nelson

[57] ABSTRACT

A modular connector assembly for the distribution of power to printed circuit board comprising first and second pairs of matable individual connector modules having different power carrying characteristics. A first connector module of each pair has a pluggable mating face located transversely of a board engaging face and a second connector module of each pair has a complimentary pluggable mating face located opposite the board engaging face, board engaging faces having the same common dimensions. Individual modules of respective pairs are provided with latch members engageable by relative rotation of adjoining modules, to link and interlock them together to form a composite connector body mounted in a row along one edge of a daughter board, and when additional matable modules are mounted along the face of a mother board respectively, the matable modules of respected pairs are in corresponding positions, whereby the daughter board can simply be plugged to and unplugged from the mother board.

10 Claims, 3 Drawing Sheets

PROGRAMMABLE MODULAR CONNECTOR ASSEMBLY

This application is a continuation of application Ser. No. 855,225 filed 4/22/86, now abandoned.

The invention relates to the distribution of power to printed circuit boards of processing units such as computers.

In processing units, it is necessary to distribute different levels of power such as high and low current and data-carrying signals to individual circuit boards to enable operation of their different components. Conventionally, this has required the provision of different discrete connectors for each power level on spaced-apart locations on the board. For example, high current may be connected from a power pack to a bus on the back plane (mother board) or power board by one connector and subsequently to individual boards by other connectors while data strength current also requires different individual connectors on the individual board and/or the mother board. Where individual daughter boards are pluggably connected directly to the mother board, it is by a connector having a single type fixed current-carrying level.

The utilization of several different types of connector spaced at different locations on the boards requires relatively complex interconnection patterns with large space requirements. Disconnection of the individual connectors is time-consuming when servicing or repair is necessary, possibly with down time of the entire unit.

According to the invention, there is provided a modular connector assembly for the distribution of power to a printed circuit board comprising first and second pairs of matable individual connector modules having different power carrying characteristics, a first connector module of each pair having a pluggable mating face located transversely of a board-engaging face and the second connector module of each pair having a complementary pluggable mating face located opposite a board-engaging face, the board-engaging faces having the same common dimensions, first individual modules of respective pairs being provided with means to link and interlock them together with other mutually opposite faces of adjacent modules to form a composite connector body when mounted in a row along one edge of a daughter board with the mating faces extending perpendicular to the plane of the daughter board, and second individual modules of respective pairs being provided with means to link and interlock them together with other mutually opposite faces of adjacent modules to form a composite connector body when mounted in a row along the face of a mother board with matable modules of respective pairs in corresponding positions and their mating faces extending parallel to the plane of the mother board whereby the daughter board can be releasably connected to the mother board for distribution of different power levels thereto by simultaneous mating of the composite connector bodies by a simple plugging action.

The individual modules may be linked and interlocked together to form composite connector halves independently of the printed circuit board.

In this manner, complete energy distribution can be provided to boards of a processing unit at a single location using a composite connector assembly programmable according to a user's requirement. Furthermore, assembly and disassembly of the boards with their energy supplying composite connectors can be readily achieved by a simple plugging action. In addition, economy of construction and readily determinable board space requirements for boards having different functions are facilitated.

An example of the invention will now be described with reference to the accompanying drawings in which.

Figure 1:
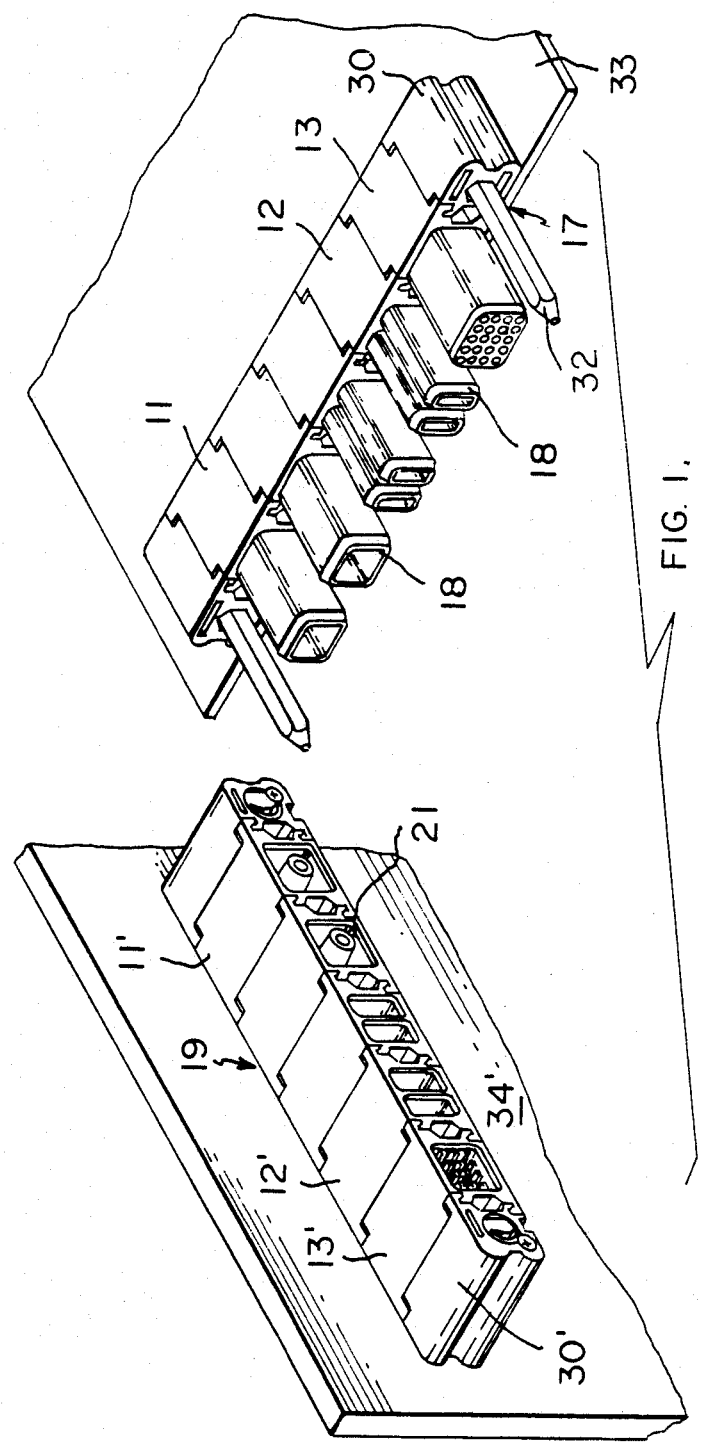
FIG. 1 is a perspective view of the modular connector assembly according to the invention.
Figure 2:
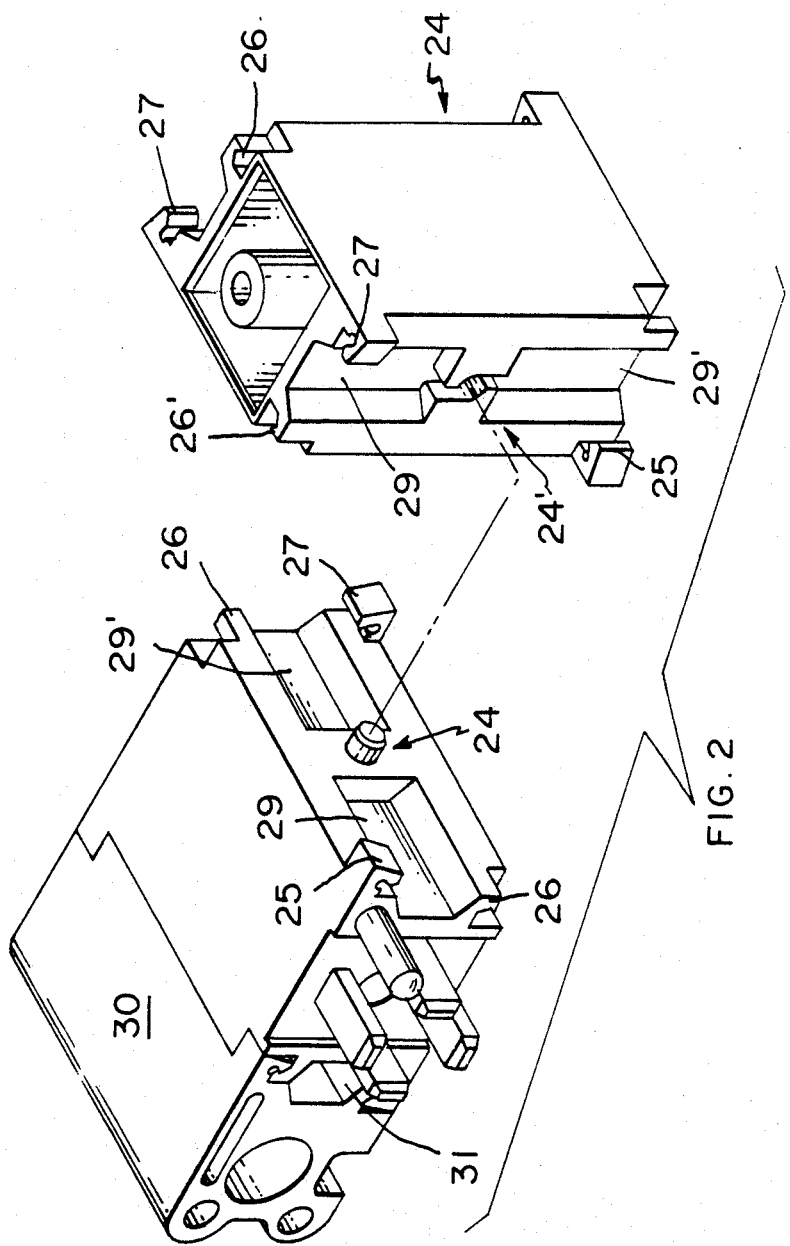
FIG. 2 is a perspective view of first connectors of the first and second connector pairs.
Figure 3A:
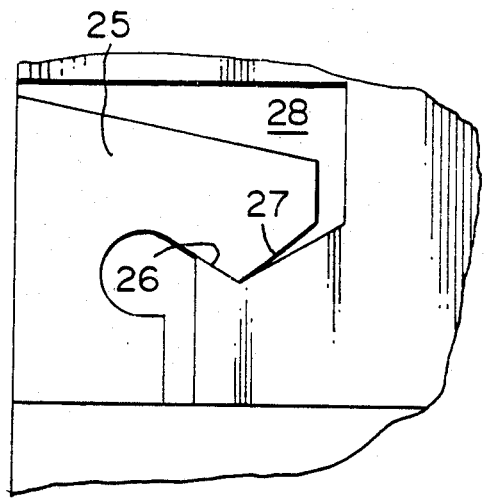
FIGS. 3a and 3b are fragmentary elevational views of the module.
Figure 3B:
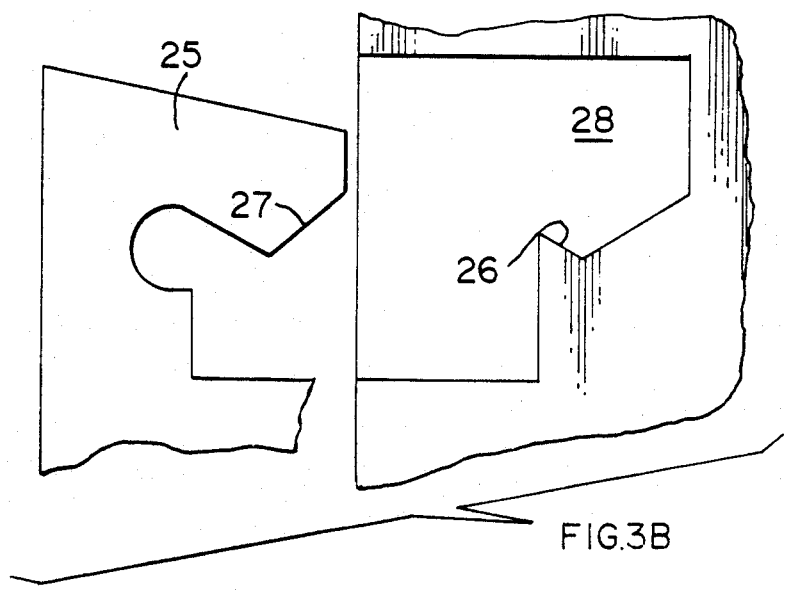

The modular connector assembly comprises first, second, and third pairs of matable individual connector modules 11, 11'; 12, 12'; and 13, 13', respectively, each pair having contacts with different current-carrying characteristics. Each first connector module 11, 12 or 13 of each pair has a board connecting face 17 located transversely of a pluggable mating face 18 and each second connector module 11', 12', or 13' of each pair has a board-connecting portion 19 located opposite a pluggable mating face 21. The board-connecting portions have the same common dimensions. Each module is provided on respective other, mutually opposite, faces 24, 24' with latch means to link and interlock them together comprising a plurality of interengageable hooks and catches 25 and 26 which face in opposite rotational senses on respective faces 24 and 24'. Each face is rectangular and the hooks and catches 25 and 26 are located on alternate corners equidistant from a central rotational axis at which is located a pivot pin on one face 24 and a socket on the other face 24'. The hooks 25 are resilient and are formed with camming noses 27 such that they can flex to engage the catches 26 which are located in pockets 28 formed in the face during movement from the condition of FIG. 3a to that of FIG. 3b. Each face is formed with recesses 29, 29' opening at corresponding locations which recesses are brought into registration to form cooling cavities 31 when the modules are rotated together to bring the hooks and catches into latching engagement.

It will be evident from the foregoing that individual first connector modules of different current-carrying types can be latched together to form a composite connector half mounted by means of end modules 30 having similar latching means and coding pins 32, projecting from mating faces without the need for further support, and such composite connector half mounted to extend along one edge of a daughter board 33 for plugging engagement with a similar composite connector half comprising individual second connector modules mounted (with complementary end modules 30') on the face of a mother board to form a modular connector assembly to distribute various different power inputs between the mother and daughter boards.

If desired, the composite connector half formed by the second individual connectors can be mounted in a bulkhead rather than on the mother board.

An advantage of the particular latching means is that the rotational movement needed for latching together individual modules precludes inadvertent unlatching.

It is envisaged that some modules may be adapted to carry fibre optic power supplies to the boards.

I claim:

1. A modular connector assembly for the distribution of power to a printed circuit board comprising first and second pairs of matable individual connector modules having different power carrying characteristics, a first connector module of each pair having a pluggable mating face located transversely of a board-engaging face and the second connector module of each pair having a complementary pluggable mating face located opposite a board-engaging face, the board-engaging faces having the same common dimensions, the first individual modules of respective pairs being provided with other, first, pairs of mutually opposite faces extending perpendicularly of the mating and board-engaging faces and having first means to link and interlock them with respective ones of other mutually opposite faces of adjacent modules to form a composite connector body when mounted in a row along one edge of a daughter board such that the mating faces extend perpendicularly to the plane of the printed circuit board, and the second individual modules of respective pairs being provided with other, second, pairs of mutually opposite faces extending perpendicularly of the mating and board-engaging faces and having second means to link and interlock them with respective ones of such other mutually opposite faces of the adjacent modules to form a composite connector body when mounted in a row along the face of a mother board with matable modules of respective pairs in corresponding positions and their mating faces extending parallel to the plane of the mother board, said first and second linking and interlocking means between respective adjacent first and second modules comprising a plurality of interengageable latch members located around and equidistant from a central rotational axis on each of the other mutually opposite faces, the latch members on one of such other mutually opposite faces being oriented in an opposite tangential direction from the latch members on the opposite of the other faces whereby the modules can be linked and interlocked together by relative rotation of their respective other mutually opposite faces about such axes to bring the latch members into engagement.

2. The modular connector assembly according to claim 1 in which the other mutually opposite faces are formed with recesses at corresponding locations between their respective latch members, which recesses open to selected ones of the faces whereby the recesses are brought into registration when the modules are linked together to define cooling cavities opening to mating or board-connecting faces of the composite connectors.

3. The modular connector assembly according to claim 1 in which mutually complementary guide means are provided on the respective other mutually opposite faces interengageable to retain the modules on a common axis during their rotation to bring the latch members into engagement.

4. The modular connector assembly according to claim 3 in which the guide means respectively comprise a pivot and socket pin formed on the central rotational axis of respective other mutually opposite faces.

5. The modular connector assembly according to claim 4 in which the latch members comprise resilient hooks and complementary catches located alternately around the rotational axis.

6. The modular connector assembly according to claim 5 in which the catches are located in hook-receiving pockets formed on the said other mutually opposite faces.

7. A connector arrangement for the distribution of different levels of power between printed circuit boards comprising first and second pairs of matable individual connectors having different power carrying characteristics, a first connector of each pair having a pluggable mating face located transversely of a board-engaging face and the second connector of each pair having a complementary pluggable mating face located opposite a board-engaging face so that the first connectors of each pair can be mounted in a row along one edge of a daughter board with the mating faces extending perpendicular to the plane of the board, and the second individual connectors of respective pairs can be mounted in a row along the face of a mother board with matable connectors of respective pairs located in corresponding positions and their mating faces extending parallel to the plane of the mother board whereby the daughter board can be releasably connected to the mother board for distribution of different power levels thereto by mating of the connectors in a simple plugging action,
  characterized in that the connectors are modular, first individual modules of respective pairs being provided with other, first, pairs of mutually opposite faces extending perpendicularly of the mating and board-engaging faces and having means to rotatably link and interlock them with respective ones of their other mutually opposite faces of the first adjacent modules to form a first composite connector body, and the second individual connectors of respective first and second pairs being provided with other, second, pairs of mutually opposite faces extending perpendicularly of the mating and board-engaging faces and having means to rotatably link and interlock them with respective ones of their other mutually opposite faces of the adjacent modules to form a second composite connector body, the relative positions of the first and second individual modules in the composite bodies being interchangeable.

8. The connector arrangement according to claim 7, characterized in that the board-engaging faces of the modules have the same common dimensions.

9. A modular connector assembly for the distribution of power to a printed circuit board comprising first and second pairs of matable individual connector modules having different power carrying characteristics, a first connector module of each pair having a pluggable mating face and a board-engaging face and the second connector module of each pair having a complementary pluggable mating face and a board-engaging face, the board-engaging faces of respective modules having the same common dimensions, the first individual modules of respective pairs being provided with other, first, pairs of mutually opposite faces extending perpendicularly of the mating and board-engaging faces and having first means to link and interlock them with respective ones of other mutually opposite faces of adjacent modules to form a composite connector body when mounted in a row along one face of a first circuit board, and the second individual modules of respective pairs being provided with other, second, pairs of mutually opposite faces extending perpendicularly of the mating and board-engaging faces and having second means to link and interlock them with respective ones of such other mutually opposite faces of the adjacent modules to form a composite connector body when mounted in a row on one face of a second circuit board with matable modules of respective pairs in corresponding positions on their respective circuit boards, said first and second linking and interlocking means between respective adjacent first and second modules comprising a plurality of interengageable latch members located around and equidistant from a central rotational axis on each of the other mutually opposite faces, the latch members on one of such other mutually opposite faces being oriented in an opposite tangential direction from the latch members on the opposite of the other faces whereby the modules can be linked and interlocked together by relative rotation of their respective other mutually opposite faces about such axes to bring the latch members into engagement.

10. The modular connector assembly according to claim 9 in which mutually complementary guide means are provided on the respective other mutually opposite faces interengageable to retain the modules on a common axis during their rotation to bring the latch members into engagement.

* * * * *